United States Patent
Ye et al.

(10) Patent No.: US 11,444,276 B2
(45) Date of Patent: Sep. 13, 2022

(54) SILICON-GRAPHITE COMPOSITE, PREPARATION METHOD THEREOF, AND LITHIUM BATTERY ANODE AND LITHIUM BATTERY CONTAINING SILICON-GRAPHITE COMPOSITE

(71) Applicants: CALB Technology Co., Ltd., Jiangsu (CN); CALB Co., Ltd., Jiangsu (CN)

(72) Inventors: Jianbo Ye, Changzhou (CN); Xuyi Shan, Luoyang (CN); Zhimin Wang, Luoyang (CN)

(73) Assignees: CALB Technology Co., Ltd., Jiangsu (CN); CALB Co., Ltd., Jiangsu (CN)

( * ) Notice: Subject to any disclaimer, the term of this patent is extended or adjusted under 35 U.S.C. 154(b) by 245 days.

(21) Appl. No.: 17/012,004

(22) Filed: Sep. 3, 2020

(65) Prior Publication Data
US 2021/0184207 A1    Jun. 17, 2021

(30) Foreign Application Priority Data
Dec. 12, 2019 (CN) .......................... 201911273844.2

(51) Int. Cl.
| | |
|---|---|
| H01M 4/36 | (2006.01) |
| H01M 4/38 | (2006.01) |
| H01M 4/587 | (2010.01) |
| H01M 10/0525 | (2010.01) |
| H01M 4/02 | (2006.01) |

(52) U.S. Cl.
CPC .......... *H01M 4/366* (2013.01); *H01M 4/386* (2013.01); *H01M 4/587* (2013.01); *H01M 10/0525* (2013.01); *H01M 2004/021* (2013.01); *H01M 2004/027* (2013.01)

(58) Field of Classification Search
None
See application file for complete search history.

(56) References Cited

FOREIGN PATENT DOCUMENTS

| | | |
|---|---|---|
| CN | 104009211 | 4/2017 |
| CN | 109713285 | 5/2019 |
| WO | 2007069664 | 6/2007 |
| WO | 2015044618 | 4/2015 |

OTHER PUBLICATIONS

Wen Liu et al., "Electrospray synthesis of nano-Si encapsulated in graphite/carbon microplates as robust anodes for high performance lithium-ion batteries", Sustainable Energy & Fuels, Jan. 2018, pp. 679-687.
Xianhua Hou et al., "Facile spray-drying/pyrolysis synthesis of intertwined SiO@CNFs&G composites as superior anode materials for Li-ion batteries", RSC Advances, Jan. 2014, pp. 34615-34622.

(Continued)

*Primary Examiner* — Wyatt P Mcconnell
(74) *Attorney, Agent, or Firm* — JCIP Global Inc.

(57) ABSTRACT

A silicon-graphite composite, a preparation method thereof, and a lithium battery anode and a lithium battery containing the silicon-graphite composite are provided in an embodiment of the disclosure. The silicon-graphite composite includes graphite and a silicon source fiber. The silicon source fiber is embedded in an interlayer structure of the graphite. The silicon-graphite composite is used as an anode material of the lithium battery in an embodiment of the disclosure.

16 Claims, 1 Drawing Sheet

(56) References Cited

OTHER PUBLICATIONS

Jingxing Wu et al., "The critical role of carbon in marrying silicon and graphite anodes for high-energy lithium-ion batteries", Carbon Energy, Sep. 5, 2019, pp. 57-76.
N.Dimov et al., "Mixed silicon-graphite composites as anode material for lithium ion batteries: Influence of preparation conditions on the properties of the material", Journal of Power Sources, Sep. 2004, pp. 108-114.
Xuyan Liu et al., "Solutions for the problems of silicon-carbon anode materials for lithium-ion batteries", Royal Society Open Science, Jun. 2018, pp. 1-22.
"Search Report of Europe Counterpart Application", dated Dec. 7, 2020, p. 1-p. 12.

SILICON-GRAPHITE COMPOSITE, PREPARATION METHOD THEREOF, AND LITHIUM BATTERY ANODE AND LITHIUM BATTERY CONTAINING SILICON-GRAPHITE COMPOSITE

CROSS-REFERENCE TO RELATED APPLICATION

This application claims the priority benefit of China application serial no. 201911273844.2, filed on Dec. 12, 2019. The entirety of the above-mentioned patent application is hereby incorporated by reference herein and made a part of this specification.

BACKGROUND

Technical Field

The disclosure relates to a silicon-graphite composite, and in particular to a silicon-graphite composite used in a lithium battery anode.

Description of Related Art

The silicon-graphite composite material is used as an anode material of a lithium battery. As shown in FIG. 1, in existing anode materials, a silicon source 2 is only simply embedded in an interlayer or a surface structure of a graphite sheet 1. During the long-term cycle of the battery, the silicon source 2 in the interlayer or the surface structure of the graphite sheet 1 will gradually fall off and gradually separate from the graphite sheet 1, thereby causing the cycle performance of the battery to gradually decline.

SUMMARY

The disclosure provides a silicon-graphite composite, including a graphite and a silicon source fiber. The silicon source fiber is embedded in an interlayer structure of the graphite.

An embodiment of the disclosure provides a preparation method of a silicon-graphite composite, including the following steps. A silicon source fiber is provided. The silicon source fiber and a flake graphite are dispersed and mixed in a solvent, and are calcined after removing the solvent to obtain the silicon-graphite composite. The calcination process is performed in an oxygen-free atmosphere.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DETAILED DESCRIPTION OF DISCLOSED EMBODIMENTS

Figure 1:
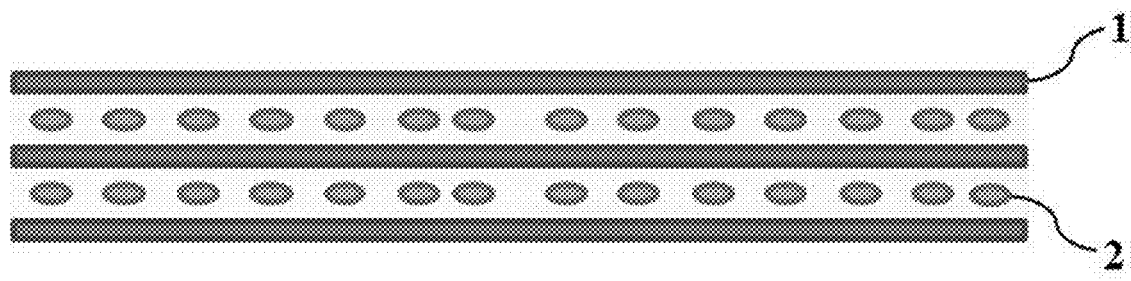
FIG. 1 is a schematic diagram of a structure of an existing anode material of a lithium battery.

The disclosure will be described in detail below in conjunction with specific embodiments.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

Typical embodiments embodying the features and advantages of the disclosure will be described in detail in the following descriptions. It should be understood that the disclosure may have various changes in terms of different embodiments, which do not deviate from the scope of the disclosure. Also, the descriptions and drawings are essentially used for illustration, and are not intended to limit the disclosure.

According to an embodiment of the disclosure, a silicon-graphite composite includes a graphite and a silicon source fiber. The silicon source fiber is embedded in an interlayer structure of the graphite.

According to an embodiment of the disclosure, the graphite is a flake graphite with a roughness Ra of not less than 10.

According to an embodiment of the disclosure, the silicon source fiber is a silicon source fiber with a roughness Ra of not less than 10.

According to an embodiment of the disclosure, the silicon-graphite composite further includes a carbon coating layer. The carbon coating layer coats the graphite and the silicon source fiber.

According to an embodiment of the disclosure, a preparation method of a silicon-graphite composite includes the following steps. A silicon source fiber is provided. The silicon source fiber and a flake graphite are dispersed and mixed in a solvent, and are calcined after removing the solvent to obtain the silicon-graphite composite. The calcination process is performed in an oxygen-free atmosphere.

According to an embodiment of the disclosure, the preparation method includes the following steps. The silicon source fiber and an organic carbon source are mixed to obtain an organic carbon source-silicon source composite fiber. The organic carbon source-silicon source composite fiber and the flake graphite are dispersed and mixed in the solvent, and are calcined after removing the solvent to obtain the silicon-graphite composite. The organic carbon source is selected from one or more of a carbohydrate, an organic acid, and fats and oils.

According to an embodiment of the disclosure, the preparation of the flake graphite includes the following steps. A flake oxidized graphite is dispersed in a solvent to form a dispersion liquid. The dispersion liquid is spray-dried to obtain the flake graphite with a roughness Ra of not less than 10.

According to an embodiment of the disclosure, the calcination process is performed in an organic atmosphere.

An embodiment of the disclosure further provides a lithium battery anode, including the silicon-graphite composite or a silicon-graphite composite obtained by the preparation method.

An embodiment of the disclosure further provides a lithium battery, including the lithium battery anode.

The silicon-graphite composite according to an embodiment of the disclosure is used as an anode material of a lithium battery, which may prevent deintercalation and loss of a silicon source.

Figure 2:
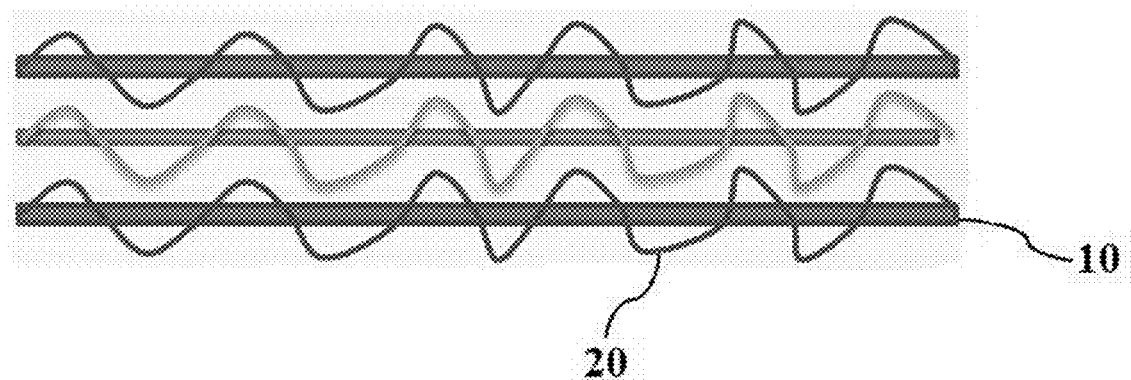
FIG. 2 is a schematic diagram of a structure of an anode material of a lithium battery according to an embodiment of the disclosure.

Referring to FIG. 2, an embodiment of the disclosure provides a silicon-graphite composite, including a flake graphite 10 and a silicon source fiber 20. The silicon source fiber 20 is embedded in an interlayer structure of the flake graphite 10.

In the disclosure, the silicon source fiber 20 is inserted into the interlayer of the flake graphite 10. The silicon source fiber 20 may be restrained through the interactive force of the graphite interlayer, so as to play a role in suppressing expansion and deintercalation.

In an embodiment, the roughness Ra of the flake graphite 10 is not less than 10, that is, the surface roughness Ra of each sheet in the graphite sheet structure is not less than 10.

In an embodiment, the roughness Ra of the flake graphite 10 may be 10-100, and preferably 80-100, such as 15, 20, 25, 30, 50, 80, etc. The greater the roughness of the flake graphite 10, the stronger the action with the silicon source fiber 20.

In an embodiment, the roughness Ra of the silicon source fiber 20 is not less than 10, and may further be 10-100, and preferably 80-100, such as 15, 20, 25, 30, 50, 80, etc. The greater the roughness of the silicon source fiber 20, the stronger the action with the flake graphite 10.

In an embodiment, the flake graphite 10 or the silicon source fiber 20 with the roughness Ra of not less than 10 may be referred to as a wrinkled flake graphite or a wrinkled silicon source fiber.

In an embodiment, the silicon source fiber 20 refers to a silicon-containing fiber, which may be, for example, a silicon fiber, a silicon oxide fiber, etc.

In an embodiment, the diameter of the silicon source fiber 20 may be 1-1000 nm, such as 5 nm, 10 nm, 20 nm, 50 nm, 80 nm, 100 nm, 300 nm, 500 nm, 800 nm, etc.

In an embodiment, the diameter of the silicon source fiber 20 may be 5-50 nm, such as 6 nm, 8 nm, 10 nm, 12 nm, 15 nm, 20 nm, 25 nm, 30 nm, 40 nm, etc. The diameter of the silicon source fiber 20 being 5-50 nm leaves a buffer space for the graphite interlayer, which may further improve the cycle performance.

In an embodiment, the wrinkled flake graphite 10 and the wrinkled silicon source fiber 20 may interact through the rough surfaces. For example, the protruding portion of the silicon source fiber 20 acts on the protrusion or recession of the flake graphite 10, alternatively, the recessing portion of the silicon source fiber 20 acts on the protrusion or recession of the wrinkled flake graphite 10. As such, the contact area between the silicon source fiber 20 and the flake graphite 10 is increased while increasing the interaction therebetween.

In an embodiment, the mass of the silicon source fiber 20 is 10-100% of the mass of the flake graphite 10, that is, the ratio of the mass of the silicon source fiber 20 to the mass of the flake graphite 10 may be 1:1-1:10, such as 1:2, 1:2.5, 1:4, 1:5, 1:6, 1:8, 1:9, etc.

Figure 3:
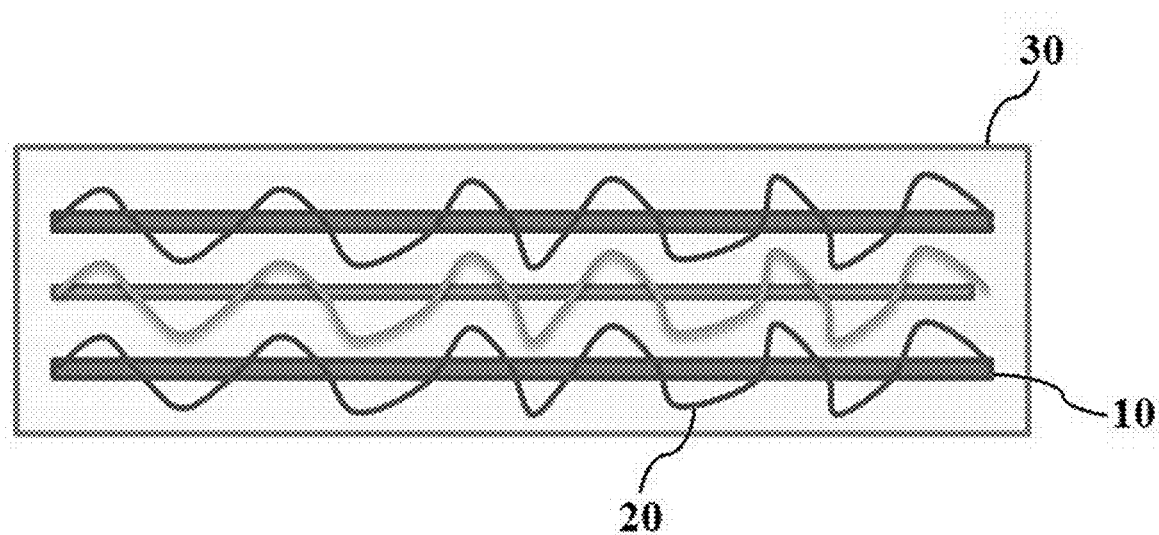
FIG. 3 is a schematic diagram of a structure of an anode material of a lithium battery according to another embodiment of the disclosure.

Referring to FIG. 3, a silicon-graphite composite according to an embodiment of the disclosure further includes a carbon coating layer 30 coating the flake graphite 10 and the silicon source fiber 20. Coating a layer of, for example, amorphous carbon outside the wrinkled flake graphite 10 and silicon source fiber 20 may further prevent the silicon source from desorbing to the graphite.

An embodiment of the disclosure provides a preparation method of a silicon-graphite composite, including the following steps. A silicon source fiber is provided. The silicon source fiber and a flake graphite are dispersed and mixed in a solvent, and are calcined after removing the solvent to obtain the silicon-graphite composite. The calcination process is performed in an oxygen-free atmosphere.

In an embodiment, the oxygen-free atmosphere used for calcination may be a nitrogen atmosphere, an organic atmosphere, etc.

In an embodiment, a carbon coating layer 30 may be formed outside silicon-graphite through calcining the silicon source fiber and the flake graphite in the organic atmosphere.

In an embodiment, the organic atmosphere is formed by one or more of methane, ethane, propane, ethylene, and propylene.

In an embodiment, the preparation method of the silicon-graphite composite includes the following steps. 1) The silicon source fiber and an organic carbon source are mixed to obtain an organic carbon source-silicon source composite fiber. 2) The organic carbon source-silicon source composite fiber and the flake graphite are dispersed in a solvent to form a dispersion liquid, and are calcinated in an oxygen-free atmosphere after removing the solvent to obtain the silicon-graphite composite. The organic carbon source is selected from one or more of a carbohydrate, an organic acid, and fats and oils.

In an embodiment, the silicon source fiber and the organic carbon source are mixed, so that the organic carbon source is coated with the silicon source fiber. Then, the surface of the silicon source fiber is wrinkled through a subsequent processing process.

In the preparation process of the silicon-graphite composite according to an embodiment of the disclosure, the solvent used may be water.

In an embodiment, the organic carbon source may be glucose.

In an embodiment, the molecular weight of the organic carbon source is 180-1000, such as 200, 220, 250, 300, 400, 500, 600, and 800. The organic carbon source within the molecular weight range is more easily adsorbed onto the surface of the silicon source fiber during the preparation process.

In an embodiment, the mass ratio of the silicon source fiber to the organic carbon source is 1:1-1:100, such as 1:5, 1:10, 1:20, 1:50, 1:75, 1:90, etc.

In an embodiment, the silicon source fiber and the organic carbon source are dried after mixing to obtain the organic carbon source-silicon source composite fiber.

In an embodiment, the preparation of the wrinkled flake graphite includes the following steps. The flake graphite is oxidized by adopting an existing oxidation process to obtain a flake oxidized graphite. The flake oxidized graphite is dispersed in water to obtain a dispersion liquid of oxidized graphite with a mass fraction of 3-8%. The dispersion liquid of oxidized graphite is spray-dried to obtain the wrinkled flake graphite.

In an embodiment, Step 2) includes the following steps. The wrinkled flake graphite is dispersed in water. Then, the organic carbon source-silicon source composite fiber is added. A filter cake is obtained by stirring, suction filtration, and drying. Then, the filter cake is calcined in an oxygen-free atmosphere to obtain a wrinkled silicon-wrinkled graphite composite.

In an embodiment, the mass ratio of the flake graphite to water is 1:10-1:100, such as 1:15, 1:20, 1:30, 1:50, 1:70, 1:90, etc.

In an embodiment, the calcination temperature of the filter cake is 500-1000° C., such as 600° C., 700° C., 800° C., 900° C., etc.

The silicon-graphite composite according to an embodiment of the disclosure is used as an anode material of a lithium battery, which may have a higher capacity retention rate and a lower expansion rate.

In an embodiment, the silicon source is limited to the wrinkled flake graphite through the wrinkled structure, which may prevent the separation of the silicon source and the carbon source (graphite) during the long-term cycle of the battery.

In an embodiment, the presence of the wrinkled structure in the silicon source fiber and the flake graphite may serve to buffer the volume expansion of the silicon source.

In an embodiment, the presence of the wrinkle structure in the silicon source fiber and the flake graphite may further increase the specific surface area of the anode material and improve the adsorption ability thereof, so that even if a portion of the silicon source falls off after being dissolved, the silicon source will still be adsorbed by the huge specific surface area.

In an embodiment, the silicon source may be effectively limited to the structure through designing both the silicon source fiber and the flake graphite as rough wrinkled structures, then assembling the two into a composite structure, and coating the surface of the composite structure with a layer of carbonaceous structure, thereby further preventing the separation of the silicon source and the carbon source during the long-term cycle of the battery.

An embodiment of the disclosure provides a lithium battery anode, including the silicon-graphite composite.

An embodiment of the disclosure further provides a lithium battery, including the lithium battery anode.

The preparation and application of the silicon-graphite composite according to an implementation of the disclosure will be further described below with reference to the drawings and specific embodiments. The raw materials used are all commercially available and the relevant tests involved are as follows:

Battery test: Wuhan LAND test system is adopted to investigate the electrochemical performance of the button battery. The charge/discharge rate is 0.1 C and the charge voltage range is 5 mV-1.5V;

Expansion rate test of pole piece of working electrode: the battery is disassembled after cycling for 500 weeks. The thickness of the pole piece of the working electrode is measured. The expansion rate of the pole piece is calculated.

Embodiment 1

1) After a flake graphite and water are mixed and dispersed at a mass ratio of 1:100, a silicon source fiber with a diameter of 5 nm is added thereto. The mass ratio of the flake graphite to the silicon source fiber is 10:1. A dry filter cake is obtained by suction filtration and drying after stirring and mixing. Then, the dry filter cake is calcined at 800° C. in a nitrogen atmosphere, and is cooled to obtain an anode material of a silicon-graphite composite without wrinkles.

2) Preparation of pole piece of working electrode: A slurry is prepared through stirring. Then, the slurry is coated onto a copper foil by adopting an automatic coating machine and is dried at 80° C. The dried pole piece is first rolled by a pair-roller mill (at a pressure of 15 MPa), and then cut into small round pieces with a diameter of 16 mm, and the thickness of the small round pieces is recorded.

The solvent of the slurry is deionized water. The active material is the anode material of the silicon-graphite composite without wrinkles obtained above. The conductive agent is acetylene black. The binder is LA133. The weight ratio of the active material to the conductive agent to the binder is controlled as 80:10:10. The thickness of the copper foil is 10 μm.

3) Assembly of button battery: A lithium metal sheet is used as the counter electrode. The electrolyte is EC/DMC (v/v=1/1) electrolyte containing 1.0 M $LiPF_6$. The separator adopts a polyethylene separator. The button battery is assembled by installing a cathode shell, the pole piece of the working electrode, a diaphragm, the lithium sheet, a nickel foam, a stainless-steel gasket, and an anode shell in a glove box.

Embodiment 2

The raw materials and process conditions adopted in the present embodiment are basically the same as those in Embodiment 1, except that the calcination of the dried filter cake in Step 1) is performed in a methane atmosphere to obtain a carbon-coated anode material of a silicon-graphite composite without wrinkles.

Embodiment 3

1) Graphite is oxidized to obtain oxidized graphite. Then, the oxidized graphite is dispersed in water to obtain a dispersion liquid of oxidized graphite with a mass fraction of 3%. Finally, the dispersion liquid of oxidized graphite is spray-dried to obtain wrinkled flake graphite with a surface roughness Ra of 80.

2) After mixing and dispersing the wrinkled flake graphite and water at a mass ratio of 1:100, a silicon source fiber with a diameter of 5 nm is add thereto. The mass ratio of the wrinkled flake graphite to the silicon source fiber is 10:1. A dry filter cake is obtained by suction filtration and drying after stirring and mixing. Then, the dry filter cake is calcined at 800° C. in a nitrogen atmosphere, and is cooled to obtain an anode material of a silicon-wrinkled graphite composite.

3) Preparation of pole piece of working electrode: A slurry is prepared through stirring. Then, the slurry is coated onto a copper foil by adopting an automatic coating machine and is dried at 80° C. The dried pole piece is first rolled by a pair-roller mill (at a pressure of 15 MPa), and then cut into small round pieces with a diameter of 16 mm, and the thickness of the small round pieces is recorded.

The solvent of the slurry is deionized water. The active material is the anode material of the silicon-wrinkled graphite composite obtained above. The conductive agent is acetylene black. The binder is LA133. The weight ratio of the active material to the conductive agent to the binder is controlled as 80:10:10. The thickness of the copper foil is 10 μm.

4) Assembly of button battery: A lithium metal sheet is used as the counter electrode. The electrolyte is EC/DMC (v/v=1/1) electrolyte containing 1.0 M $LiPF_6$. The separator adopts a polyethylene separator. The button battery is assembled by installing a cathode shell, the pole piece of the working electrode, a diaphragm, the lithium sheet, a nickel foam, a stainless-steel gasket, and an anode shell in a glove box.

Embodiment 4

The raw materials and process conditions adopted in the present embodiment are basically the same as those in Embodiment 3, except that the calcination of the dried filter cake in Step 2) is performed in a methane atmosphere to obtain a carbon-coated anode material of a silicon-wrinkled graphite composite.

Embodiment 5

1) A silicon fiber with a diameter of 5 nm and glucose are dried after mixing at a mass ratio of 1:20 to obtain an organic carbon source-silicon source composite fiber.

2) After flake graphite and water are mixed and dispersed at a mass ratio of 1:100, the organic carbon source-silicon source composite fiber is added thereto. The mass ratio of the flake graphite to the silicon source fiber is 10:1. A dry filter cake is obtained by suction filtration and drying after stirring and mixing. Then, the dry filter cake is calcined at 800° C. in a nitrogen atmosphere, and is cooled to obtain an anode material of a wrinkled silicon-graphite composite. The surface roughness Ra of the silicon fiber is 80.

3) Preparation of pole piece of working electrode: A slurry is prepared through stirring. Then, the slurry is coated onto a copper foil by adopting an automatic coating machine and is dried at 80° C. The dried pole piece is first rolled by a pair-roller mill (at a pressure of 15 MPa), and then cut into small round pieces with a diameter of 16 mm, and the thickness of the small round pieces is recorded.

The solvent of the slurry is deionized water. The active material is the anode material of the wrinkled silicon-graphite composite obtained above. The conductive agent is acetylene black. The binder is LA133. The weight ratio of the active material to the conductive agent to the binder is controlled as 80:10:10. The thickness of the copper foil is 10 μm.

4) Assembly of button battery: A lithium metal sheet is used as the counter electrode. The electrolyte is EC/DMC (v/v=1/1) electrolyte containing 1.0 M $LiPF_6$. The separator adopts a polyethylene separator. The button battery is assembled by installing a cathode shell, the pole piece of the working electrode, a diaphragm, the lithium sheet, a nickel foam, a stainless-steel gasket, and an anode shell in a glove box.

Embodiment 6

The raw materials and process conditions adopted in the present embodiment are basically the same as those in Embodiment 5, except that the calcination of the dried filter cake in Step 2) is performed in a methane atmosphere to obtain a carbon-coated anode material of a wrinkled silicon-graphite composite.

Embodiment 7

1) A silicon fiber with a diameter of 5 nm and glucose are dried after mixing at a mass ratio of 1:20 to obtain an organic carbon source-silicon source composite fiber.

2) Graphite is oxidized to obtain oxidized graphite. Then, the oxidized graphite is dispersed in water to obtain a dispersion liquid of oxidized graphite with a mass fraction of 3%. Finally, the dispersion liquid of oxidized graphite is spray-dried to obtain wrinkled flake graphite.

3) After mixing and dispersing the wrinkled flake graphite obtained above and water at a mass ratio of 1:100, the organic carbon source-silicon source fiber is added thereto. The mass ratio of the wrinkled flake graphite to the silicon source fiber is 10:1. A dry filter cake is obtained by suction filtration and drying after stirring and mixing. Then, the dry filter cake is calcined at 800° C. in a nitrogen atmosphere, and is cooled to obtain an anode material of a wrinkled silicon-wrinkled graphite composite. The surface roughness Ra of the silicon fiber is 80. The surface roughness of the graphite is 80.

4) Preparation of pole piece of working electrode: A slurry is prepared through stirring. Then, the slurry is coated onto a copper foil by adopting an automatic coating machine and is dried at 80° C. The dried pole piece is first rolled by a pair-roller mill (at a pressure of 15 MPa), and then cut into small round pieces with a diameter of 16 mm, and the thickness of the small round pieces is recorded.

The solvent of the slurry is deionized water. The active material is the anode material of the wrinkled silicon-wrinkled graphite composite obtained above. The conductive agent is acetylene black. The binder is LA133. The weight ratio of the active material to the conductive agent to the binder is controlled as 80:10:10. The thickness of the copper foil is 10 μm.

5) Assembly of button battery: A lithium metal sheet is used as the counter electrode. The electrolyte is EC/DMC (v/v=1/1) electrolyte containing 1.0 M $LiPF_6$. The separator adopts a polyethylene separator. The button battery is assembled by installing a cathode shell, the pole piece of the working electrode, a diaphragm, the lithium sheet, a nickel foam, a stainless-steel gasket, and an anode shell in a glove box.

Embodiment 8

The raw materials and process conditions adopted in the present embodiment are basically the same as those in Embodiment 7, except that the calcination of the dried filter cake in Step 3) is performed in a methane atmosphere to obtain a carbon-coated anode material of a wrinkled silicon-wrinkled graphite composite.

The button batteries obtained in Embodiments 1-8 are subjected to cycle and expansion tests. Refer to Table 1 for the obtained data.

TABLE 1

|  | 500-week capacity retention rate | 500-week expansion rate of pole piece |
|---|---|---|
| Embodiment 1 | 50% | 150% |
| Embodiment 2 | 62% | 130% |
| Embodiment 3 | 70% | 75% |
| Embodiment 4 | 74% | 70% |
| Embodiment 5 | 72% | 73% |
| Embodiment 6 | 75% | 68% |
| Embodiment 7 | 86% | 52% |
| Embodiment 8 | 90% | 50% |

Unless specifically limited, the terms used in the disclosure have the meanings commonly understood by persons skilled in the art.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A silicon-graphite composite, comprising a graphite and a silicon source fiber, wherein the silicon source fiber is embedded in an interlayer structure of the graphite.

2. The silicon-graphite composite according to claim 1, wherein the graphite is a flake graphite with a roughness Ra of not less than 10.

3. The silicon-graphite composite according to claim 1, wherein the silicon source fiber is a silicon source fiber with a roughness Ra of not less than 10.

4. The silicon-graphite composite according to claim 2, wherein the silicon source fiber is a silicon source fiber with a roughness Ra of not less than 10.

5. The silicon-graphite composite according to claim 1, further comprising a carbon coating layer, wherein the carbon coating layer coats the graphite and the silicon source fiber.

6. The silicon-graphite composite according to claim 2, further comprising a carbon coating layer, wherein the carbon coating layer coats the graphite and the silicon source fiber.

7. The silicon-graphite composite according to claim 3, further comprising a carbon coating layer, wherein the carbon coating layer coats the graphite and the silicon source fiber.

8. The silicon-graphite composite according to claim 4, further comprising a carbon coating layer, wherein the carbon coating layer coats the graphite and the silicon source fiber.

9. A preparation method of a silicon-graphite composite, comprising:
    providing a silicon source fiber; and
    mixing the silicon source fiber and a flake graphite in a solvent, and calcining after removing the solvent to obtain the silicon-graphite composite; wherein
    the calcination process is performed in an oxygen-free atmosphere.

10. The preparation method according to claim 9, comprising:
    mixing the silicon source fiber and an organic carbon source to obtain an organic carbon source-silicon source composite fiber; and
    mixing the organic carbon source-silicon source composite fiber and the flake graphite in the solvent, and calcining after removing the solvent to obtain the silicon-graphite composite; wherein
    the organic carbon source is selected from one or more of a carbohydrate an organic acid, and fats and oils.

11. The preparation method according to claim 9, wherein a preparation of the flake graphite comprises:
    dispersing a flake oxidized graphite in a solvent to form a dispersion liquid; and
    spray-drying the dispersion liquid to obtain the flake graphite with a roughness Ra of not less than 10.

12. The preparation method according to claim 9, wherein the calcination process is performed in an organic atmosphere.

13. The preparation method according to claim 10, wherein the calcination process is performed in an organic atmosphere.

14. The preparation method according to claim 11, wherein the calcination process is performed in an organic atmosphere.

15. A lithium battery, comprising an anode, the anode comprises the silicon-graphite composite according to claim 1.

16. A lithium battery, comprising an anode, the anode comprises a silicon-graphite composite obtained by the preparation method according to claim 9.

* * * * *